/ United States Patent (12)

Chung

(10) Patent No.: US 8,322,304 B2
(45) Date of Patent: Dec. 4, 2012

(54) METHOD FOR PRODUCING NUTRIENT FROM LARVAE OF MUSCA DOMESTICA

(75) Inventor: Chun-Hsung Chung, Chang-Hua Hsien (TW)

(73) Assignee: New I Ten Rin Enterprise Co., Ltd., Chang-Hua (TW)

( * ) Notice: Subject to any disclaimer, the term of this patent is extended or adjusted under 35 U.S.C. 154(b) by 190 days.

(21) Appl. No.: 12/956,028

(22) Filed: Nov. 30, 2010

(65) Prior Publication Data

US 2012/0135120 A1    May 31, 2012

(51) Int. Cl.
*A01K 29/00* (2006.01)
(52) U.S. Cl. .......................... 119/6.5; 119/6.6
(58) Field of Classification Search .................. 119/6.5, 119/6.6; 424/76.5, 76.6
See application file for complete search history.

(56) References Cited

U.S. PATENT DOCUMENTS

| 4,594,964 A * | 6/1986 | Vargas et al. | 119/6.6 |
| 6,557,487 B1 * | 5/2003 | Fleischmann | 119/6.5 |
| 6,938,574 B2 * | 9/2005 | Zhang | 119/6.6 |
| 2002/0177219 A1 * | 11/2002 | Olivier | 435/262 |
| 2003/0143728 A1 * | 7/2003 | Olivier | 435/290.1 |
| 2003/0233982 A1 * | 12/2003 | Zhang | 119/6.5 |
| 2004/0089241 A1 * | 5/2004 | Zhang | 119/6.5 |
| 2011/0296756 A1 * | 12/2011 | Zhang | 47/59 R |

OTHER PUBLICATIONS

Larry Newton Using the Black Soldier Fly, Hermetia illucens, Value added tool for the Management of swine manure', North Carolina State University (USA) Jun. 2006.*
Joseph Diclaro and Phillip Kaufman 'Black soldier fly Hermetia illucens Linnaeus (insecta: Diptera: Stratiomyidae)' EENY-461, IFAS Extension, University of Florida (USA), Jun. 2009.*

* cited by examiner

*Primary Examiner* — Isam Alsomiri
*Assistant Examiner* — Justin Benedik
(74) *Attorney, Agent, or Firm* — Alan Kamrath; Kamrath IP Lawfirm, PA

(57) ABSTRACT

A method for producing a nutrient from larvae of *Musca Domestica* includes breeding and growing imagoes of *Musca Domestica* in an environment having a temperature of 18-35° C. and having a humidity of 50-80%. The imagoes of *Musca Domestica* lay eggs in the environment. The eggs of *Musca Domestica* are transferred into a cultivating material including at least one product of soybean and/or milk. The eggs of *Musca Domestica* are bred at a temperature of 20-35° C. until hatching into larvae. The larvae of *Musca Domestica* are placed on swine feces/urine of a thickness of 4-10 cm at a temperature of 20-35° C. for 2-3 days. The larvae feed on and decompose the swine feces/urine. The larvae of *Musca Domestica* are collected and treated by hot water and dehydrated to obtain a nutrient.

16 Claims, 1 Drawing Sheet

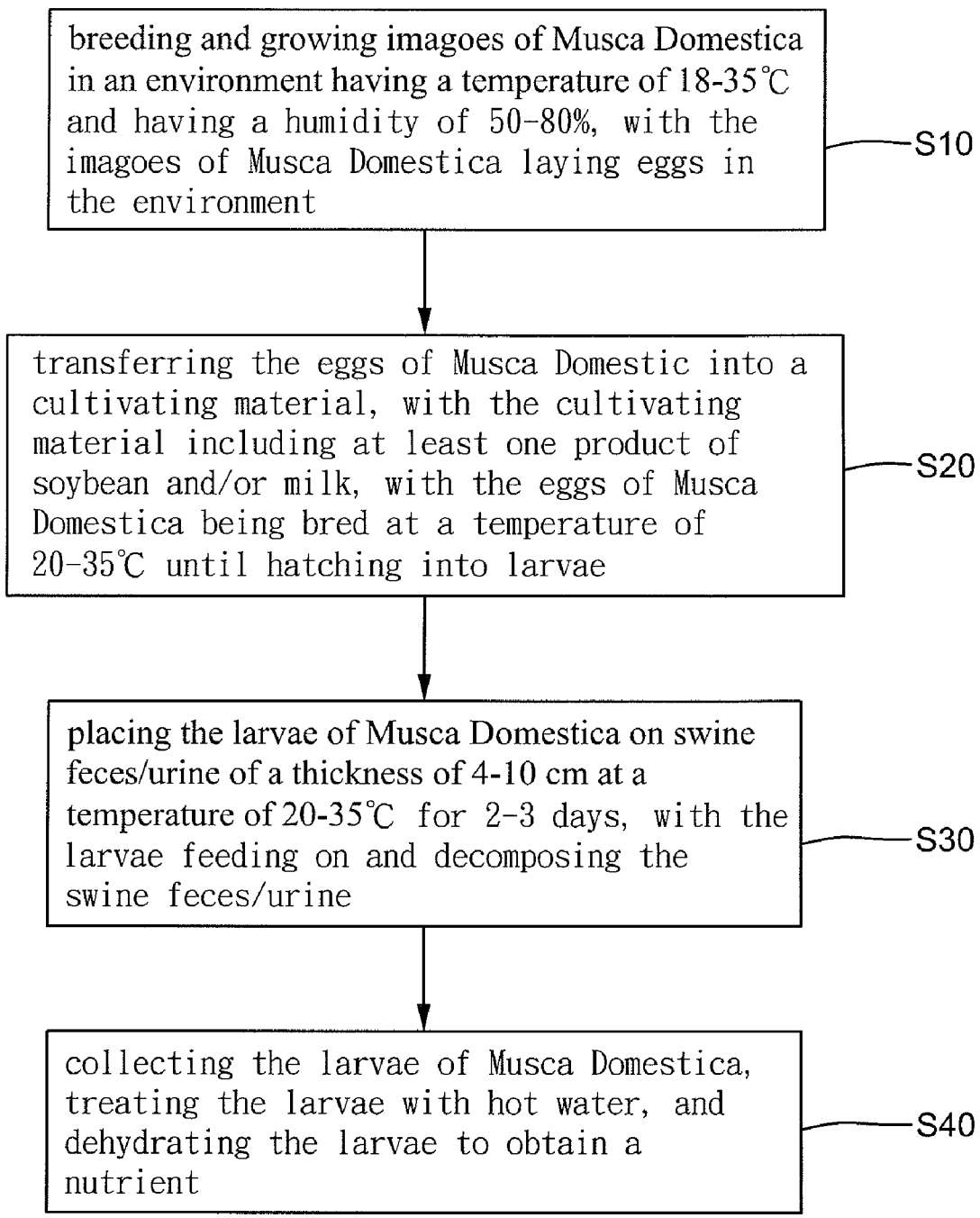

METHOD FOR PRODUCING NUTRIENT FROM LARVAE OF MUSCA DOMESTICA

BACKGROUND OF THE INVENTION

The present invention relates to a method for producing high-protein additive and, more particularly, to a method for producing a nutrient from larvae of *Musca Domestica*.

The nutrient contents in foodstuff for livestock are important to growth and health of livestock. Ordinary nutrient contents in livestock foodstuff include protein, fats, carbohydrates, vitamins, and minerals, wherein the need of protein is the most. Insufficiency or lack of these nutrient contents causes slow growth, decreased immunity, aptness of being infected by diseases, and adverse affect to the meat quality of the livestock. On the other hand, change in the eating habits, consumption of over-delicate food, or partiality for special kinds of food results in imbalanced diet such that one can not absorb sufficient nutrients, such as protein, vitamins, or minerals, required for maintaining the health of the human body. Extra nutrients are, thus, required in addition to ordinary meals.

Furthermore, animal cultivating industries, such as fish cultivators or manufacturers of animal foodstuff, have a great demand in animal protein. In response to the increasing demand in nutrients, such as animal protein, in daily life, finding new nutrient sources is a new research trend.

BRIEF SUMMARY OF THE INVENTION

To fulfill the demand in nutrients, such as protein, in various fields, the present invention provides a method for producing a nutrient from larvae of *Musca Domestica*. The method according to the present invention includes breeding and growing imagoes of *Musca Domestica* in an environment having a temperature of 18-35° C. and having a humidity of 50-80%. The imagoes of *Musca Domestica* lay eggs in the environment. The eggs of *Musca Domestic* are transferred into a cultivating material including at least one product of soybean and/or milk. The eggs of *Musca Domestica* are bred at a temperature of 20-35° C. until hatching into larvae. The larvae of *Musca Domestica* are placed on swine feces/urine of a thickness of 4-10 cm at a temperature of 20-35° C. for 2-3 days. The larvae feed on and decompose the swine feces/urine. The larvae of *Musca Domestica* are collected and treated by hot water and dehydrated to obtain a nutrient.

Preferably, the temperature of the environment in which the imagoes of *Musca Domestica* grow and lay eggs is 24-26° C.

Preferably, the humidity of the environment in which the imagoes of *Musca Domestica* grow and lay eggs is 54-56%.

The cultivating material preferably has a water content of 80-95% by weight and more preferably 92% by weight.

Preferably, the cultivating material is received in a Petri dish.

Preferably, 2-4 grams of the eggs of *Musca Domestica* are transferred per kilogram of the cultivating material.

Preferably, the imagoes of *Musca Domestica* lay eggs after the imagoes of *Musca Domestica* have grown 1-3 days.

Preferably, the eggs of *Musca Domestica* hatch into the larvae in 1-2 days.

Preferably, the swine feces/urine are received in a Petri dish.

The swine feces/urine preferably have a water content of 80-95% by weight and more preferably 92% by weight.

Preferably, an outer, dried layer of the swine feces/urine is removed during the period of time in which the larvae feed on and decompose the swine feces/urine. This avoids the larvae to pupate in the outer, dried layer and urges the larvae in the inner layer of the swine feces/urine to crawl out.

Preferably, the collected larvae are heated by hot water of 60-100° C. For 1-5 minutes.

By the method for producing a nutrient from larvae of *Musca Domestica* according to the present invention, a high-quality nutrient full of protein can be rapidly obtained at low costs. The nutrient obtained by the method according to the present invention can be added into annual foodstuff to supply nutrients required by growth of the animal, saving the costs of expensive protein additives that are generally added in conventional foodstuff while cutting the breeding costs of the animal. Furthermore, the nutrient of the larvae of *Musca Domestica* can be processed by proper procedures to obtain a high-protein nutritive additive for human bodies. Further, the method according to the present invention provides swine cultivators with an environmentally-friendly way to treat swine feces/urine and to reuse the swine feces/urine. Further, the swine cultivators can be benefited by producing and selling the nutrient of the larvae of *Musca Domestica*.

The present invention will become clearer in light of the following detailed description of illustrative embodiments of this invention described in connection with the drawing.

DESCRIPTION OF THE DRAWING

The drawing shows a block diagram illustrating a method for producing a nutrient from larvae of *Musca Domestica* according to the present invention.

DETAILED DESCRIPTION OF THE INVENTION

With reference to the drawing, to provide a new source of protein, the present invention provides a method for producing a nutrient from larvae of *Musca Domestica*. The method according to the present invention includes breeding and growing imagoes of *Musca Domestica* (house flies) in an environment having a temperature of 18-35° C. and having a humidity of 50-80%. The imagoes of *Musca Domestica* lay eggs in the environment (S10). The eggs of *Musca Domestica* are transferred into a cultivating material including at least one product of soybean and/or milk. The eggs of *Musca Domestica* are bred at a temperature of 20-35° C. until hatching into larvae (S20). The larvae of *Musca Domestica* are placed on swine feces/urine of a thickness of 4-10 cm at a temperature of 20-35° C. for 2-3 days. The larvae feed on and decompose the swine feces/urine (S30). The larvae of *Musca Domestica* are collected and treated by hot water and dehydrated to obtain a nutrient containing the larvae of *Musca Domestica* (S40). Examples of the method for producing a nutrient containing *Musca Domestica* according to the present invention will now be described.

EXAMPLE 1

Breeding of Imagoes of *Musca Domestica*

An appropriate number of wild *Musca Domestica* were placed in a space and fed with the same food. The wild *Musca Domestica* was tamed after several generations of breeding and propagation, obtaining suitable *Musca Domestica*. The pupae of the tamed *Musca Domestica* before eclosion were placed in an eclosion plate placed in a breeding cage for imagoes. The breeding cage was a sealed net cage having a size of 100-120 cm×60-80 cm×100-200 cm. The imagoes could not fly out of the breeding cage. Furthermore, the breeding cage was placed in a breeding room. The temperature of the breeding room was preferably of 18-35° C., most preferably 24-26° C. The humidity of the breeding room was preferably 50-80%, more preferably 54-56%. Further, the number of imagoes of *Musca Domestica* in the breeding cage was preferably 40,000-120,000. The breeding cage was under the light for 8-16 hours. Since the imagoes do not lay eggs in a dark environment, the breeder can adjust the period of time of the light and the dark according to the time the eggs are to be fetched. Furthermore, a tag can be affixed to the breeding cage to indicate the date on which the imagoes laid eggs and the number of eggs for control purposes.

The pupae of *Musca Domestica* turned into imagoes in 3 or 4 days. After eclosion, a food plate and a water plate were placed into the breeding cage for the imagoes. The foodstuff in the food plate included dairy products (such as milk powders) and sugar that imagoes are fond of. The imagoes began to lay eggs in 1-3 days after eclosion. A laying pan was placed into the breeding cage at that time. A laying pad was received in the laying pan. Substances such as fermented food (fermented milk or the like) capable of attracting the imagoes of *Musca Domestica* were adhered to the laying pad to attract the imagoes to lay eggs on the laying pad. The eggs were gathered periodically, and the laying pad was replaced.

EXAMPLE 2

Breeding of Larvae of *Musca Domestica*

1. First-Stage Breeding

An appropriate number of eggs of *Musca Domestica* were transferred into a plurality of first Petri dishes. 70-80% of the volume of each first Petri dish was filled with a cultivating material (about 6-8 cm in thickness). The cultivating material included at least one product of soybean and/or milk. A water content of the cultivating material was 80-95% by weight and more preferably 92% by weight. Namely, the solid content of the product of soybean and/or milk of the cultivating material was 5-20% by weight and more preferably 8% by weight. The eggs of *Musca Domestica* were bred at a temperature of 20-35° C. for several days until hatching into larvae (i.e., maggots). The water containing cultivating material provided a moist, nutritive environment for the larvae after hatching. This was the first-stage breeding.

The number of eggs was decided according to the amount of cultivating material received in each first Petri dish. Namely, it was estimated how many larvae could feed on the amount of cultivating material to estimate the number of eggs to be transferred into each first Petri dish. In an example, 2-4 grams of eggs of *Musca Domestica* were transferred per kilogram of cultivating material. The breeding underwent 1-2 days. Each first Petri dish was, but not limited to, a small container having a diameter of 10-12 cm and a height of 8-10 cm.

2. Second-Stage Breeding

Swine feces/urine were placed into a plurality of second Petri dishes to a thickness of 4-10 cm. The swine feces/urine had a water content of 80-95% by weight and more preferably 92% by weight. An appropriate number of larvae obtained in the first-stage breeding ware placed on the swine feces/urine and bred at a temperature of 20-35° C. for 2-3 days. During the breeding period, the larvae fed on the swine feces that provided a moist, nutritive environment for the larvae. This was the second-stage breeding during which the larvae grew and nourished by the nutritive ingredients in the swine feces/urine. The swine feces/urine eaten by the larvae were decomposed by the special enzymes in the larvae and then excreted out of the larvae. The excretion of the larvae can be used as excellent organic fertilizer. The whole process of decomposing the swine feces/urine by the larvae was about 2-3 days.

The number of larvae was decided according to the amount of pig feces in each second Petri dish. Namely, it was estimated how many larvae could feed on the amount of pig feces to estimate the number of larvae to be transferred into each second Petri dish. Generally, the larvae bred in a first Petri dish were placed into a second Petri dish. Each second Petri dish was, but not limited to, a large container having a length of 60-80 cm, a width of 30-50 cm, and a height of 8-14 cm.

Furthermore, since two-stage breeding is used from hatching of the eggs through growing of the larvae, the growing speed of the larvae can be increased. Further, the volume of cultivating material received in each first Petri dish (small container) is less than the pig feces received in each second Petri dish (large container), allowing observation of hatching of the eggs and growth of the larvae while assisting in adjustment and control of the first-stage breeding. The hatching rate and growth of the larvae are increased. The problems of low hatching rate and slow growth or even death of larvae resulting from difficulties in control of using large breeding containers are, thus, avoided. The costs of workers and other expenditures for fixing the problems are cut.

In the method according to the present invention, suitable breeding conditions are given in the breeding procedures from imagoes to larvae of *Musca Domestica*. Thus, the imagoes and larvae of *Musca Domestica* can grow in suitable environments. Furthermore, the two-stage breeding increases the growing speed of the larvae, shortens the breeding time, increases the yield, and improves the quality of the larvae, assisting in feeding and decomposition of the swine feces/urine by the larvae.

EXAMPLE 3

Production of Nutrient Containing Larvae of *Musca Domestica*

During the second-stage breeding, the larvae of *Musca Domestica* moved into the swine feces/urine and grew by absorbing the nutritive ingredients in the swine feces/urine. The antibiotics contained in the saliva and bodies of the larvae inhibited growth of harmful bacteria while decomposing the swine feces/urine. When the larvae grew to a mature stage, the larvae will move to a drier place (such as an outer, dried layer of the decomposed swine feces/urine in the second Petri dishes) for pupating. Thus, the larvae of *Musca Domestica* moved toward the outer, dried layer of the decomposed swine feces/urine. The swine feces/urine can be received in a device so arranged that the larvae of *Musca Domestica* crawling outwards toward the outer, dried layer will fall out of the swine feces/urine into a collecting bucket below the second Petri dishes.

During the second-stage breeding, the outer, dried layer of the decomposed swine feces/urine can be removed. This avoids the larvae to pupate in the outer, dried layer. It is appreciated that the number of larvae collected will be reduced if the larvae pupate. Furthermore, the pupae of the larvae can not move into the collecting bucket. Removal of the outer, dried layer of the decomposed swine feces/urine also urges the larvae in the inner, moist layer of the swine feces/urine to crawl out of the swine feces/urine with less effort and fall into the collecting bucket, increasing the number of larvae collected in the collecting bucket. The outer, drier layer is removed at the time the decomposed swine feces/urine become dry and lack water.

The larvae of *Musca Domestica* in the collecting bucket were gathered and cleaned to remove the swine feces/urine on the bodies of the larvae. Then, the larvae were treated by hot water of 60-100° C. for 1-5 minutes to kill the larvae. Next, the larvae were dehydrated. The dehydrated larvae are nutrient substances full of protein. The dehydrated larvae can be further dried by an oven.

The swine feces/urine contained undigested foodstuff, metabolites, mucous membranes, and secretions. After eating and absorbing these substances in the swine feces/urine, the larvae of *Musca Domestica* were full of nutrient substances such as protein. Table 1 shows the nutrient contents in the larvae of *Musca Domestica*.

TABLE 1

Nutrient Contents in Larvae of *Musca Domestica*

| nutrient content | dried larvae |
| --- | --- |
| crude protein | 53.2% |
| crude fat | 26.9% |
| crude fiber | 5.6% |
| crude ash | 5.0% |
| phosphorus | 886 mg/100 g |
| calcium | 374 mg/100 g |
| magnesium | 177 mg/100 g |

According to Table 1, the protein contained in the larvae of *Musca Domestica* is up to 53.2%, higher than 40% (the standard value recommended by the World Health Organization and Food and Agriculture Organization). Furthermore, the protein contained in the larvae of *Musca Domestica* includes amino acids (see Table 2). In addition to protein, the larvae of *Musca Domestica* also contain fats and minerals and other nutritive substances. As an example, most of the fatty acids in the larvae of *Musca Domestica* are unsaturated fatty acids, including 28.8% of palmitic acid, 23.7% of palmitoleic acid, and 24.6% of oleic acid.

TABLE 2

Amino Acids in Proteins of Larvae of *Musca Domestica*

| amino acid | percent (%) |
| --- | --- |
| phenylalaine | 3.43 |
| tryptophan | 0.71 |
| lysine | 3.93 |
| valine | 2.53 |
| leucine | 4.67 |
| histidine | 1.48 |
| threonine | 2.18 |
| isoleucine | 1.79 |
| arginine | 2.89 |
| tyrosine | 2.79 |
| alanine | 2.74 |
| methionine | 2.19 |
| proline | 2.21 |
| glutamic acid | 7.29 |
| serine | 2.14 |
| aspartic acid | 5.19 |
| cystine | 0.52 |

Antibiotic experiments showed that extraction of the dried larvae of *Musca Domestica* can repress the growth of *Escherichia coli*. Namely, the larvae of *Musca Domestica* are antibiotic.

Furthermore, a portion of larvae of *Musca Domestica* fell into the collective bucket turned into pupae. The pupae can also be cleaned, heated by hot water, and dehydrated to produce dried pupae. The dried pupae is full of nutritive substances such as high protein. Furthermore, the body walls of the pupae are full of chitinase that can be used, too.

According to the foregoing, a nutrient full of protein can be rapidly produced from larvae of *Musca Domestica* in 5-7 days by the method according to the present invention while reusing the nutrients in the swine feces/urine as well as avoiding pollution to the air and water sources by the swine feces/urine. Furthermore, the tools and equipment used in the method according to the present invention are simple and inexpensive and can be easily operated. Thus, intensive breeding of *Musca Domestica* and mass production of larvae of *Musca Domestica* for obtaining protein can be proceeded, allowing mass-scale production of high-quality protein at low costs.

The treated larvae of *Musca Domestica* can be added into animal foodstuff, such as foodstuff for livestock, fish, and pets, to increase the amount of nutrients including protein while inhibiting growth of disease-causing bacteria, which is good to the growth and health of the animal. Furthermore, the larvae of *Musca Domestica* can be further processed by procedures meeting the food sanitary requirements into animal protein edible by human as a high-protein nutrient additive.

Although specific embodiments have been illustrated and described, numerous modifications and variations are still possible without departing from the essence of the invention. The scope of the invention is limited by the accompanying claims.

The invention claimed is:

1. A method for producing a nutrient from larvae of *Musca Domestica* comprising:
   breeding and growing imagoes of *Musca Domestica* in an environment having a temperature of 18-35° C. and having a humidity of 50-80%, with the imagoes of *Musca Domestica* laying eggs in the environment;
   transferring the eggs of *Musca Domestica* into a cultivating material, with the cultivating material including at least one product of soybean or milk, with the eggs of *Musca Domestica* being bred at a temperature of 20-35° C. until hatching into larvae;
   placing the larvae of *Musca Domestica* on swine feces/urine of a thickness of 4-10 cm at a temperature of 20-35° C. for 2-3 days, with the larvae feeding on and decomposing the swine feces/urine; and
   collecting the larvae of *Musca Domestica*, treating the larvae with hot water, and dehydrating the larvae to obtain a nutrient.

2. The method as claimed in claim 1, with breeding and growing the imagoes of *Musca Domestica* including growing the imagoes of *Musca Domestica* in the environment having a temperature of 24-26° C., with the imagoes of *Musca Domestica* laying eggs in the environment.

3. The method as claimed in claim 1, with breeding and growing the imagoes of *Musca Domestica* including growing the imagoes of *Musca Domestica* in the environment having a humidity of 54-56%, with the imagoes of *Musca Domestica* laying eggs in the environment.

4. The method as claimed in claim 1, with the imagoes of *Musca Domestica* laying eggs after the imagoes of *Musca Domestica* has grown 1-3 days.

5. The method as claimed in claim 1, with the eggs of *Musca Domestica* hatching into the larvae in 1-2 days.

6. The method as claimed in claim 1, with transferring the eggs of *Musca Domestica* including transferring 2-4 grams of the eggs of *Musca Domestica* per kilogram of the cultivating material.

7. The method as claimed in claim 1, with transferring the eggs of *Musca Domestica* into the cultivating material including transferring the eggs of *Musca Domestica* into the cultivating material in a Petri dish.

8. The method as claimed in claim 1, with transferring the eggs of *Musca Domestica* including transferring the eggs of *Musca Domestica* into the cultivating material having a water content of 80-95% by weight.

9. The method as claimed in claim 1, with transferring the eggs of *Musca Domestica* including transferring the eggs of *Musca Domestica* into the cultivating material having a water content of 92% by weight.

10. The method as claimed in claim 1, with transferring the eggs of *Musca Domestica* including transferring the eggs of *Musca Domestica* into the cultivating material including milk powders.

11. The method as claimed in claim 1, with placing the larvae of *Musca Domestica* on the swine feces/urine including placing the larvae of *Musca Domestica* on the swine feces/urine received in a Petri dish.

12. The method as claimed in claim 1, further comprising: removing an outer, dried layer of the decomposed swine feces/urine during a period of time the larvae feed on and decompose the swine feces/urine.

13. The method as claimed in claim 1, with placing the larvae of *Musca Domestica* on the swine feces/urine including placing the larvae of *Musca Domestica* on the swine feces/urine having a water content of 80-95% by weight.

14. The method as claimed in claim 1, with placing the larvae of *Musca Domestica* on the swine feces/urine including placing the larvae of *Musca Domestica* on the swine feces/urine having a water content of 92% by weight.

15. The method as claimed in claim 1, with treating the larvae with hot water including treating the larvae with hot water of 60-100° C.

16. The method as claimed in claim 1, with treating the larvae with hot water including treating the larvae with hot water for 1-5 minutes.

* * * * *